United States Patent
Goluguri

(10) Patent No.: US 11,589,082 B2
(45) Date of Patent: Feb. 21, 2023

(54) LIVE VIEW COLLECTION AND TRANSMISSION SYSTEM

(71) Applicant: Toyota Motor North America, Inc., Plano, TX (US)

(72) Inventor: Jaya Bharath R. Goluguri, McKinney, TX (US)

(73) Assignee: Toyota Motor North America, Inc., Plano, TX (US)

( * ) Notice: Subject to any disclaimer, the term of this patent is extended or adjusted under 35 U.S.C. 154(b) by 522 days.

(21) Appl. No.: 16/201,578

(22) Filed: Nov. 27, 2018

(65) Prior Publication Data

US 2020/0169762 A1 May 28, 2020

(51) Int. Cl.

| | |
|---|---|
| *H04N 21/2187* | (2011.01) |
| *H04N 21/4223* | (2011.01) |
| *H04N 21/222* | (2011.01) |
| *H04N 21/258* | (2011.01) |
| *H04N 21/437* | (2011.01) |
| *H04N 21/858* | (2011.01) |
| *H04N 21/414* | (2011.01) |
| *H04N 21/239* | (2011.01) |

(52) U.S. Cl.
CPC ....... *H04N 21/2187* (2013.01); *H04N 21/222* (2013.01); *H04N 21/2393* (2013.01); *H04N 21/25841* (2013.01); *H04N 21/41422* (2013.01); *H04N 21/4223* (2013.01); *H04N 21/437* (2013.01); *H04N 21/8586* (2013.01)

(58) Field of Classification Search
CPC ........... H04N 21/2187; H04N 21/4223; H04N 21/222; H04N 21/25841; H04N 21/437; H04N 21/8586; H04N 21/41422; H04N 21/2393
See application file for complete search history.

(56) References Cited

U.S. PATENT DOCUMENTS

| | | | |
|---|---|---|---|
| 9,918,001 B2 | 3/2018 | Pisz | |
| 2011/0320964 A1* | 12/2011 | Gambhir | G06F 3/0481 |
| | | | 715/756 |

(Continued)

FOREIGN PATENT DOCUMENTS

| | | |
|---|---|---|
| CN | 104202673 A | 12/2014 |
| CN | 107798860 A | 3/2018 |

(Continued)

*Primary Examiner* — Yassin Alata
(74) *Attorney, Agent, or Firm* — Dinsmore & Shohl LLP

(57) ABSTRACT

A system including a third-party server and a live-view server is disclosed. The live-view server receives, from the third-party server, a request for a live view of each location, structure, or point of interest; identifies at least one vehicle positioned at each location, structure, or point of interest; obtains each requested live view from a live-view camera of the at least one identified vehicle; and transmits, to the third-party server, a dynamic hyperlink associated with each requested live view. The third-party server receives, from a request device, a request for a live view of a specific location, structure, or point of interest; identifies at least one live view, from a live-view database, associated with the specific location, structure, or point of interest; and serves to the request device, via the dynamic hyperlink, the at least one live view.

20 Claims, 5 Drawing Sheets

(56) References Cited

U.S. PATENT DOCUMENTS

2016/0057335 A1*  2/2016  Pisz .................. H04N 5/23206
                                                                  348/149
2016/0371551 A1   12/2016  Atsmon et al.
2020/0029190 A1*  1/2020  Bruns .................... H04L 29/08

FOREIGN PATENT DOCUMENTS

| KR | 100835399 | B1 | 6/2008 |
| KR | 101682048 | B1 | 12/2016 |
| WO | WO-201882900 | * | 3/2018 |
| WO | 2018082900 | A1 | 5/2018 |

* cited by examiner

LIVE VIEW COLLECTION AND TRANSMISSION SYSTEM

BACKGROUND

The present disclosure generally relates to systems and/or methods for serving live camera views to requesting devices.

Service providers providing maps (e.g., STREET VIEW® of Google Maps[SM] and Google Earth[SM], and/or the like) and navigation systems (e.g., Garmin™, TOMTOM®, vehicle-installed navigation systems, and/or the like) do not provide images that reflect recent and continuously ongoing changes to a particular location. For example, Google STREET VIEW® only displays a still image of a particular location in response to a user request. Notably, that still image is often outdated and fails to reflect a true representation of a current view at that particular location. This is often frustrating for a user wishing to view live conditions at a particular location, a particular structure, or a particular point of interest.

SUMMARY

In one embodiment, a system for serving live views captured by a plurality of vehicles having live-view cameras to request devices includes a third-party server including a live-view database, and a live-view server communicatively coupled with the third-party server. In such an embodiment, the live-view server includes a live-view application, the live-view application executable by the live-view server to: i) receive, from the third-party server, a request for a live view of each location of a plurality of locations, each structure of a plurality of structures, or each point of interest of a plurality of points of interest, ii) identify at least one vehicle of a plurality of vehicles positioned at each location, each structure, or each point of interest, wherein a live-view camera of the at least one identified vehicle captures each requested live view, iii) obtain each requested live view from the live-view camera of the at least one identified vehicle, and iv) transmit, to the third-party server, a dynamic hyperlink associated with each requested live view for storage in the live-view database. Further, in such an embodiment, the third-party server: i) receives, from a request device, a request for a live view of a specific location, a specific structure, or a specific point of interest, ii) identifies at least one live view, from the live-view database, associated with the specific location, the specific structure, or the specific point of interest requested by the request device, and iii) serves to the request device, via the dynamic hyperlink, the at least one live view associated with the specific location, the specific structure, or the specific point of interest.

In another embodiment, a computer-implemented method for serving live views captured by a plurality of vehicles having live-view cameras to request devices includes: i) receiving from a third-party server, by a live-view server communicatively coupled to the third-party server, a request for a live view of each location of a plurality of locations, each structure of a plurality of structures, or each point of interest of a plurality of points of interest, ii) identifying, by the live-view server, at least one vehicle of a plurality of vehicles positioned at each location, each structure, or each point of interest, wherein a live-view camera of the at least one identified vehicle captures each requested live view, iii) obtaining, by the live-view server, each requested live view from the live-view camera of the at least one identified vehicle, iv) transmitting to the third-party server, by the live-view server, a dynamic hyperlink associated with each requested live view for storage in a live-view database of the third-party server, v) receiving from a request device, by the third-party server, a request for a live view of a specific location, a specific structure, or a specific point of interest, vi) identifying from the live-view database, by the third-party server, at least one live view associated with the specific location, the specific structure, or the specific point of interest requested by the request device, and vii) serving to the request device, by the third-party server, the at least one live view associated with the specific location, the specific structure, or the specific point of interest via the dynamic hyperlink.

In yet another embodiment, a system for serving live views captured by a plurality of vehicles having live-view cameras to request devices includes a first processing device communicatively coupled to a live-view database, and a second processing device communicatively coupled with the first processing device. In such an embodiment, the second processing device includes a non-transitory processor-readable storage medium having programming instructions that, when executed, cause the second processing device to: i) receive, from the first processing device, a request for a live view of each location of a plurality of locations, each structure of a plurality of structures, or each point of interest of a plurality of points of interest, ii) identify at least one vehicle of a plurality of vehicles positioned at each location, each structure, or each point of interest, wherein a live-view camera of the at least one identified vehicle captures each requested live view, iii) obtain each requested live view from the live-view camera of the at least one identified vehicle, and iv) transmit to the first processing device, a dynamic hyperlink associated with each requested live view for storage in the live-view database. Further, in such an embodiment, the first processing device includes a non-transitory processor-readable storage medium having programming instructions that, when executed, cause the first processing device to: i) receive, from a request device, a request for a live view of a specific location, a specific structure, or a specific point of interest, ii) identify at least one live view, from the live-view database, associated with the specific location, the specific structure, or the specific point of interest requested by the request device, and iii) serve to the request device, via the dynamic hyperlink, the at least one live view associated with the specific location, the specific structure, or the specific point of interest.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

The present disclosure relates to systems and methods that provide a live view of a location, a structure, and/or a point of interest to a third-party service provider (e.g., commercial map service provider, navigation system service provider, and/or the like) to supplement or supplant maps and/or information previously provided to service recipients (e.g., via request devices) by the third-party service provider to improve the convenience and experience of the service recipients. For example, according to various embodiments of the present disclosure, a third-party service provider (e.g., a map provider, a navigation system provider, and/or the like) can supplement or supplant its service (e.g., map service, navigation service, and/or the like) with one or more than one real-time live view of a particular location, a particular structure, and/or a particular point of interest requested by the service recipient.

Figure 1:
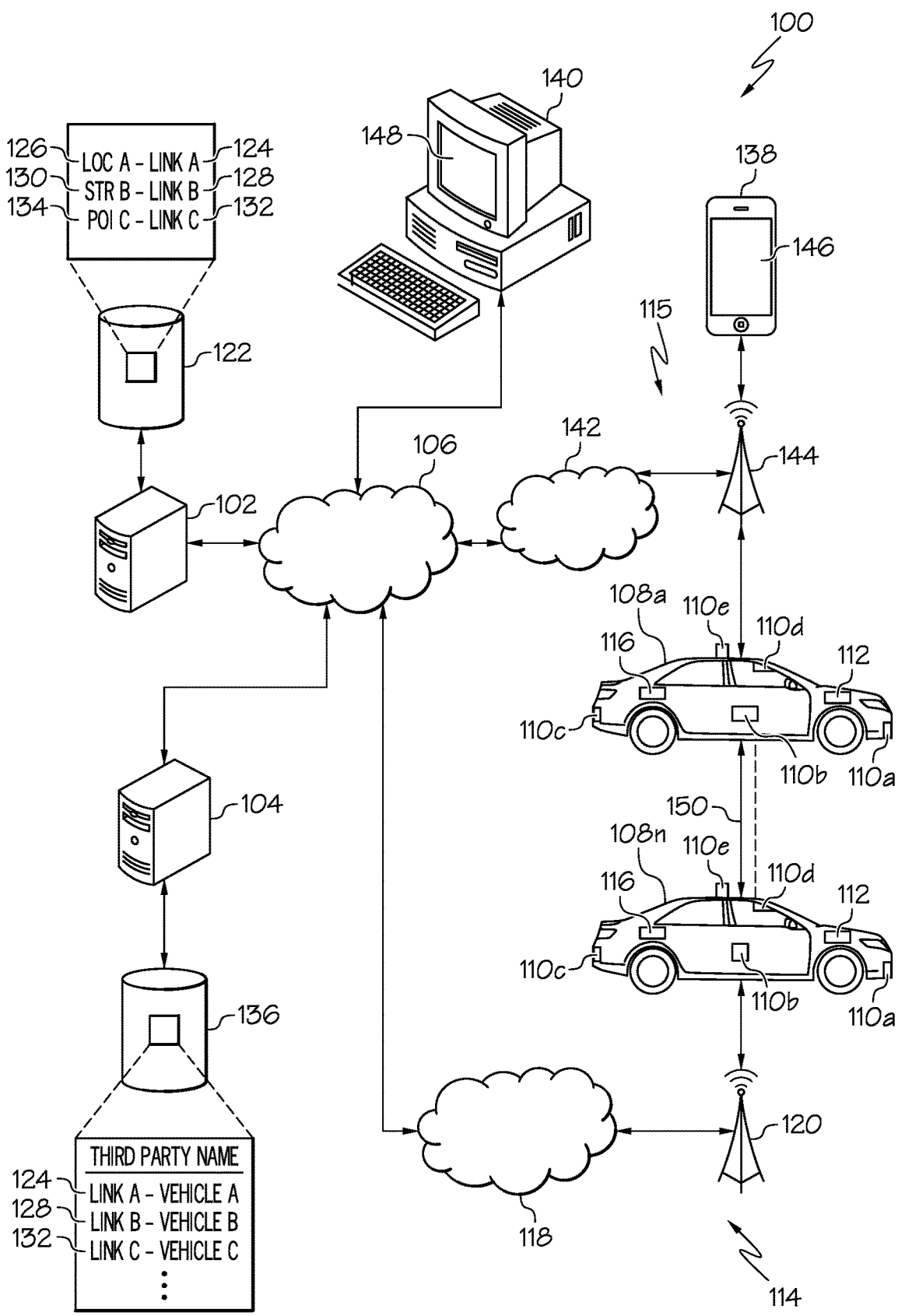
FIG. 1 depicts an illustrative system for serving live views captured by a plurality of vehicles having live-view cameras to request devices according to one or more embodiments shown and described herein.

Referring now to the drawings, FIG. 1 depicts a live-view system 100 including a third-party service provider server 102 and a live-view server 104. According to such aspects, the third-party service provider server 102 is communicatively coupled to the live-view server 104 via a communication network 106. According to various aspects, the third-party service provider server 102 may be any type of computing device. According to other aspects, the third-party service provider server 102 is a particular machine specifically programmed to perform particular functions as described herein. According to one aspect, the third-party service provider server 102 may include multiple computing devices. According to alternative aspects, the third-party service provider server 102 may include a cloud server. Notably, according to embodiments described herein, the third-party service provider server 102 includes a processor (e.g., central processing unit), memory (e.g., RAM, storage medium, and/or the like), and a bus for accessing and/or storing data in the memory. The memory is further configured to store one or more executable programs that, upon execution by the processor, permit the processor to access and transmit live views as described herein. Similarly, according to various aspects, the live-view server 104 may be any type of computing device. According to other aspects, the live-view server 104 is a particular machine specifically programmed to perform particular functions as described herein. According to one aspect, the live-view server 104 may include multiple computing devices. According to alternative aspects, the live-view server 104 may include a cloud server. Notably, according to embodiments described herein, the live-view server 104 includes a processor (e.g., central processing unit), memory (e.g., RAM, storage medium, and/or the like), and a bus for accessing and/or storing data in the memory. The memory is further configured to store one or more executable programs that, upon execution by the processor, permit the processor to process and transmit live views as described herein.

According to various aspects described herein, the live-view server 104 obtains live views recorded by one or more cameras 110a-110e positioned on a vehicle 108a-108n (e.g., one or a plurality of vehicles denoted by the dashed line). According to various aspects, a camera 110a may be located at the front of the vehicle, a camera 110b may be located on one or more side of the vehicle, a camera 110c may be located at the rear of the vehicle, a camera 110d may be located externally-facing (e.g., through a windshield, rear window, door window, pillar window, and/or the like) from an interior of the vehicle, and/or a camera 110e may be located on an outer surface (e.g., roof surface, hood surface, trunk surface, and/or the like) of the vehicle. According to various aspects, any of the one or more cameras 110a-110e may be configured to capture live video. In an alternative aspect, the one or more cameras 110a-110e may be configured to capture live video and/or still images. According to various aspects, any of the one or more cameras 110a-110e may include a panoramic camera. According to further aspects a camera (e.g., 110b, 110d, and/or the like) may be a rear-facing camera or a forward-facing camera. According to other aspects a camera, e.g., 110e, may include a light imaging, detection, and ranging (LIDAR) system (e.g., to provide depth information). According to further aspects, each camera of the one or more cameras 110a-110e may actively capture live views and automatically transmit the live views to the live-view server 104 (e.g., push aspect). According to other aspects, each camera of the one or more cameras 110a-110e may only transmit live views to the live-view server 104 upon request (e.g., pull aspect).

Referring again to FIG. 1, a computer 112 on each vehicle 108a-108n may be configured to receive respective live views from the one or more cameras 110a-110e and transmit the live views, via a wireless communication system 114 and/or 115, to the live-view server 104. According to such aspects, the computer 112 may be any type of computing device installed and/or associated with the vehicle 108a-108n. According to other aspects the computer 112 is a particular machine specifically programmed to perform particular functions as described herein. According to one aspect, the computer 112 may include multiple computing devices. Notably, according to embodiments described herein, the computer 112 includes a processor (e.g., central processing unit), memory (e.g., RAM, storage medium, and/or the like), and a bus for accessing and/or storing data (e.g., live-views) in the memory. The memory is further configured to store one or more executable programs that, upon execution by the processor, permit the processor to receive and transmit live views as described herein.

Figure 2:
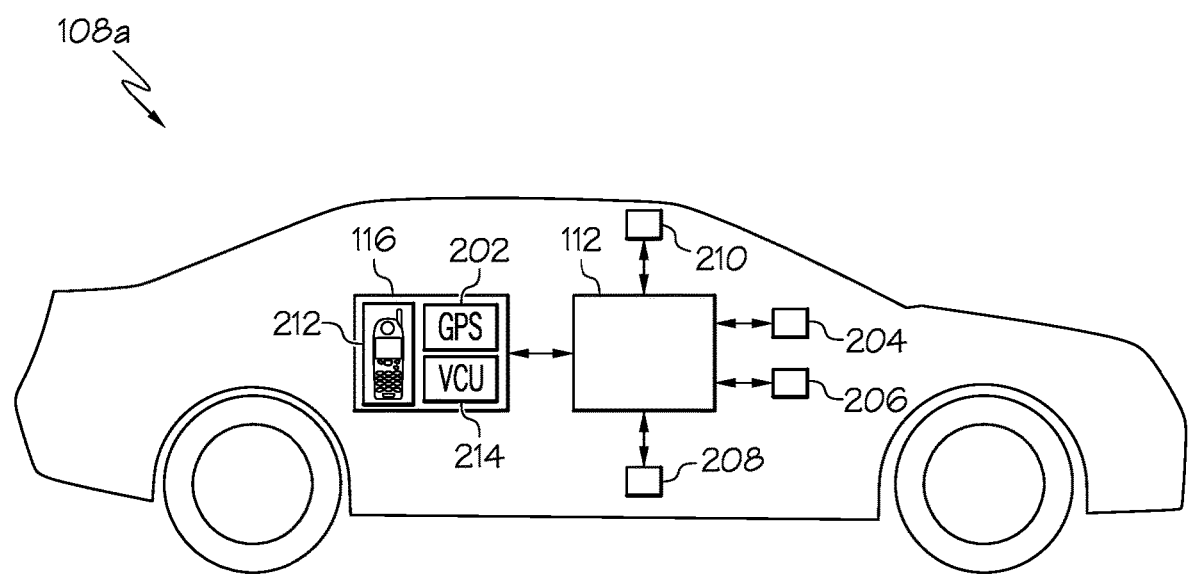
FIG. 2 depicts a block diagram of an illustrative vehicle computer coupled to a plurality of data detecting devices, the vehicle computer being configured to associate recorded data with received live views according to one or more embodiments shown and described herein.

Referring to FIGS. 1 and 2, according to various aspects, the computer 112 of each vehicle 108a-108n is communicatively coupled to a wireless telematic communication unit 116 with suitable hardware and software for transmitting and receiving data (e.g., live view data). In view of FIG. 2, the wireless telematic communication unit may include an in-vehicle cellular phone 212, a global positioning system (GPS) device 202, an on-board vehicle communication unit (VCU) 214, and/or the like. According to various aspects, each wireless telematic communication unit 116 may be communicatively coupled to a wireless carrier system 118 and/or 142 (e.g., a cellular telephone network, a satellite communication system, and/or the like). According to such aspects, each wireless telematic communication unit 116 may initiate communication with the wireless carrier system 118 or 142 via a base station 120 or 144, respectively (e.g., a node of the wireless carrier system) determined to be in proximity to each respective vehicle 108a-108n. Further in such aspects, once a radio communication link has been established between the wireless telematic communication unit 116 and a base station 120 or 144, the base station 120 or 144 is configured to utilize at least one communication network (e.g., communication network 106) communicatively coupled to the wireless carrier system 118 or 142 respectively to relay the data (e.g., live view data) received from the computer 112, via the wireless telematic communication unit 116, to the live-view server 104. According to various aspects, the communication network 106 may include a Wide Area Network (WAN), the Internet, a Wi-Fi network, and/or the like.

Referring again to FIG. 1, according to various aspects of the present disclosure, live views may be obtained via vehicle to vehicle (V2V) communications 150. According to such aspects a first vehicle (e.g., 108n) may not be able to establish a communication link with the live-view server 104 (e.g., the first vehicle is not communicatively coupled to the live-view server 104) but may be able to establish a communication link with a second vehicle (e.g. 108a). According to such an aspect, the first vehicle (e.g., 108n) may be able to transmit live views to the live-view server 104 and/or request live-views (e.g., using interfaces described herein) from the live view server 104 via the V2V communication link 150 between the first vehicle (e.g., 108n) and the second vehicle (e.g., 108a). According to an alternative aspect, the first vehicle (e.g., 108n) may be able to transmit live views to the second vehicle (e.g., 108a) and/or request live-views (e.g., using interfaces described herein) from the second vehicle (e.g., 108a) via the V2V communication link 150 without involving the live-view sever 104. In such an aspect, similar to as described herein, a request for a live view of a particular location, a particular structure, and/or a particular point of interest is made, vehicles capable of V2V communications in proximity to the particular location are identified, and the identified vehicles may provide image data to the requesting vehicle which includes the live view of the particular location, the particular structure and/or the particular point of interest. According to alternative aspects, any of vehicles 108a-108n (e.g., participating vehicles) may transmit live views on a regular basis as the most current live view of a particular location, a particular structure, and/or a particular point of interest. According to further aspects, a time associated with a request from a request device may influence the way a live view is obtained. For example, if a live-view server 104 has determined, at the requested time, that a participating first vehicle (e.g. 108a) currently linked to its dynamic hyperlink is no longer in proximity to the requested location, structure, and/or point of interest and the live-view server 104 is not able to locate another participating vehicle, at the requested time, at the requested location, structure and/or point of interest, the live-view server 104 may seek to obtain a live-view image via a V2V communication link of the participating vehicle (e.g. 108a) with another vehicle (e.g. 108n). According to such aspects, the live-view server 104 may be programmed and/or configured to obtain a requested live view according to multiple communication channels/links.

Notably, referring to FIG. 2, the computer 112 on a vehicle (e.g., vehicle 108a) may be configured to associate recorded data with live views received from the one or more cameras 110a-110e. According to one aspect, recorded data may include a geophysical location (GPS coordinates) of the vehicle 108a and a time synchronized with that geophysical location as received from a GPS device 202. According to other aspects, recorded data may include sensor data received from one or more sensors configured to sense vehicle-associated parameters. Examples of sensor data include vehicle acceleration data detected by an accelerometer 204, vehicle speed data detected by a speed sensor 206, ambient temperature and/or weather data detected at the geophysical location of the vehicle by a temperature sensor 208, and/or the like. According to such aspects, the computer 112 is further configured to transmit such recorded data, associated with respective live views, to the live-view server 104 (e.g., via the wireless telematic communication unit 116) for updates to information in a link database 136 coupled to the live-view server 104 (See FIG. 1).

Referring again to FIG. 2, according to various embodiments described herein, the computer 112 on a vehicle 108a may be coupled to a live-view interface 210 (e.g., inside the vehicle 108a). In such an aspect, the live-view interface 210 is configured to display data (e.g. live views), received from at least one of the live-view server 104 or the third-party service provider server 102 as described herein. According to various aspects the live-view interface 210 is further configured to receive a request from a vehicle operator for a particular live-view associated with a particular location, a particular structure and/or a particular point of interest as described herein.

Figure 3:
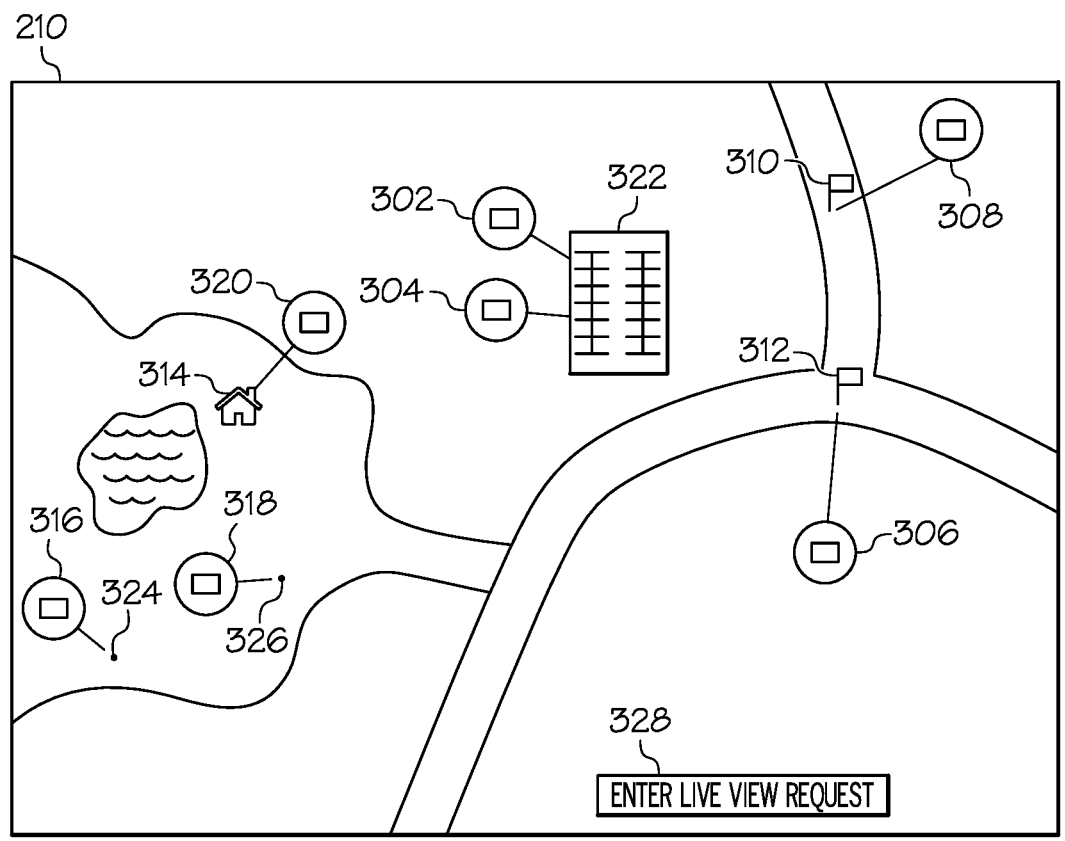
FIG. 3 depicts an illustrative live-view interface according to one or more embodiments shown and described herein.

Referring now to FIG. 3, according to various embodiments, the live-view interface 210 is further configured to display a map provided by a commercial map service provider and/or a navigation interface provided by a navigation system service provider. Here, according to alternative aspects, such an interface may be displayed on a plurality of devices including a vehicle live-view interface 210 as well as other interfaces such as a mobile phone interface 146 (e.g., FIG. 1) and/or a personal computer interface 148 (e.g., FIG. 1), and/or the like. Notably, however, according to various aspects of the present disclosure, the live-view interface 210 is configured to associate icons with available live views associated with particular locations, particular structures and/or particular points of interest. For example, live-view icon 302 and live-view icon 304 indicate that live views are available of a parking deck 322 (e.g., a particular structure, live views within the particular structure, view indicating whether a store is open or closed, and/or the like). As another example, live-view icon 306 and live-view icon 308 indicate that live views are available of a particular flagged location/address 310 and 312 respectively (e.g., particular locations, crash scene at flagged intersection, and/or the like). As yet another example, live-view icon 320 indicates that a live view is available of a lake pavilion 314 within a park (e.g., particular point of interest). Live view icon 316 and live view icon 318 indicate further live views are available at different/alternative locations 324 and 326 respectively within the park (e.g., proximate to a point of interest).

The system, as described thus far, is capable of providing live camera views associated with a plurality of vehicles 108a-108n to a live-view server 104. In this vein, as described above, it is an object of the present disclosure for third-party service providers to access such live views to supplement or supplant maps and/or information previously provided to service recipients (e.g., via requesting devices) by the third-party service provider to improve the convenience and experience of the service recipients. As such, as shown in FIG. 1, the third-party service provider server 102 is communicatively coupled to the live-view server 104, via the communication network 106 to provide such live views, as obtained by the live view server 104, to its service recipients. Notably, however, an inherent characteristic of a live view of a particular location, a particular structure and/or a particular point of interest is that it is constantly changing (e.g., time elapses, different vehicles must be utilized to capture the current live view of the particular location, the particular structure, and/or the particular point of interest as vehicles move, and/or the like). As such, it may not suffice for the third-party service provider server 102 to simply download captured live views from the live-view server 104 to its live-view database 122 and transmit such downloaded live views, upon request, to its service recipients (e.g., downloads would have to be constant to avoid stale live views). Furthermore, it may be burdensome and/or impractical of the live-view server 104 to capture all live views of all participating vehicles 108a-108n for all locations, all structures, and/or all points of interest at all times. These and other issues are overcome by the system as described herein.

Figure 4:
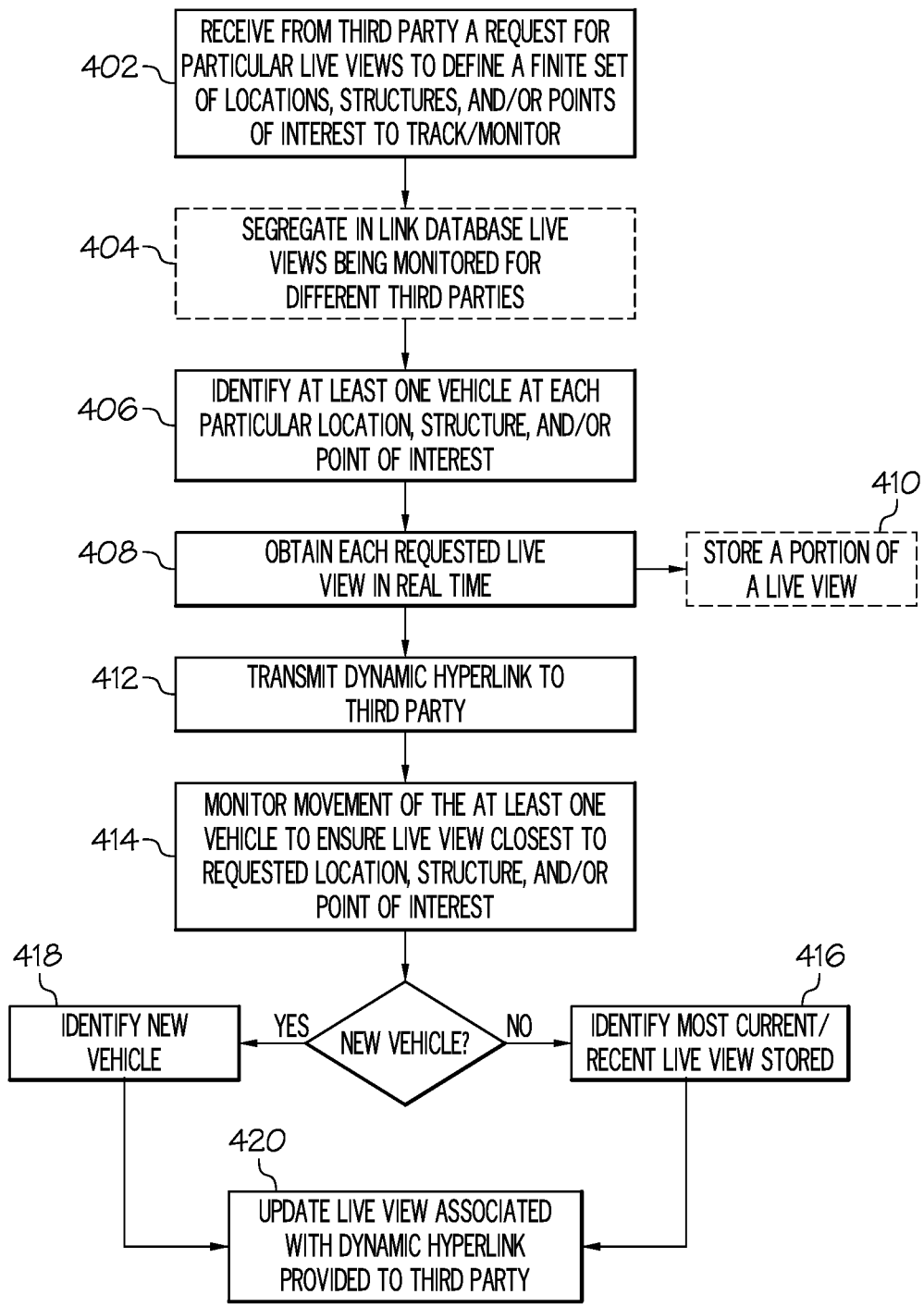
FIG. 4 depicts a flow diagram of an illustrative process for tracking or monitoring live views by the live-view server according to one or more embodiments shown and described herein.

Initially, as shown in FIG. 4, to limit the live views monitored and/or tracked by the live-view server 104, the live-view server 104 may be programmed and/or configured to receive, from the third-party service provider server 102, a request for a live view of each location of a plurality of locations, each structure of a plurality of structures, and/or each point of interest of a plurality of points of interest (at block 402). As such, the live-view server 104 is tasked with monitoring and/or tracking a finite number of locations, structures and/or points of interest. Notably, according to alternative aspects, if the live-view server 104 is communicatively coupled to a plurality of different third-party service provider servers, the live-view server 104 is still tasked with monitoring and/or tracking a finite number of locations, structures, and/or points of interest for each respective third-party service provider server. According to such aspects, the live-view server 104 may be programmed and/or configured to segregate live views being monitored and/or tracked for each respective third-party service provider (at block 404, shown in phantom as an optional/alternative step) in its link database 136.

According to the various described aspects, given a finite number of locations, structures, and/or points of interest, the live-view server 104 may be programmed and/or configured to identify at least one participating vehicle of a plurality of participating vehicles positioned at each location, each structure, or each point of interest (at block 406) and obtain each requested live view from a live-view camera of the at least one identified vehicle (at block 408, e.g., as described herein). According to various aspects, the live-view server 104 may be programmed and/or configured to store a portion of a live-view (at block 410, e.g., less than a minute of video, less than 5 minutes of video, any duration of video possible based on storage constraints, and/or the like) in its associated link database 136 (See FIG. 1). According to further aspects, the live-view server 104 may be programmed and/or configured to associate a timestamp (e.g., date and/or time) with any stored portion (e.g., begin time and/or end time) and/or any live view (e.g., begin time). Such information may be stored, in the link database 136, in association with the monitored/tracked locations, structures, and/or points of interest.

Referring again to FIG. 4, in view of FIG. 1, to avoid the storage of stale live views at the live-view database 122 (e.g., camera views no longer reflecting a true live view of a particular location, a particular structure, or a particular point of interest due to the passage of time, and/or the like), the live-view server 104 may be programmed and/or configured to transmit, to the third-party service provider server 102 a plurality of dynamic hyperlinks, each dynamic hyperlink associated with a requested live view (at block 412). For example, in view of FIG. 1, dynamic hyperlink 124 (e.g., "LINK A") is associated with a live view of a requested location 126 (e.g., "LOC A"), dynamic hyperlink 128 (e.g., "LINK B") is associated with a live view of a requested structure 130 (e.g., "STR B"), and dynamic hyperlink 132 (e.g., "LINK C") associated with a live view of each requested point of interest 134 (e.g., "POI C"). According to such an aspect, the third-party service provider server 102 is programmed and/or configured to store the plurality of dynamic hyperlinks (e.g., dynamic hyperlinks 124, 128 and 132) in its associated live-view database 122.

Referring again to FIG. 4, according to various aspects describe herein, the live-view server 104 may be programmed and/or configured to monitor the movement of the at least one participating vehicle as well as the plurality of participating vehicles (at block 414, e.g., via GPS coordinates). For example, if the at least one participating vehicle moves away from each location, each structure, and/or each point of interest more than a predefined threshold distance (e.g., distance at which a live view of the particular location, the particular structure, and/or the particular point of interest is no longer viable or visible), the live-view server 104 may be programmed and/or configured to again identify at least one participating vehicle of the plurality of participating vehicles positioned at each location, each structure, or each point of interest (at block 418, e.g., another of the plurality of participating vehicles may be able to provide a live-view closer to the particular location, the particular structure and/or the particular point of interest). In situations where no participating vehicle is available, the live-view server 104 may be programmed and/or configured to identify a most recent view (e.g., video) stored (e.g., in the link database 136) for the particular location, the particular structure, and/or the particular point of interest (at block 416). In either case, upon the identification of a new participating vehicle and/or the identification of a most recent view (e.g. video), the live-view server 104 may be programmed and/or configured to update the live view associated with the dynamic hyperlink previously provided to the third-party service provider server 102 (at block 420). In view of FIG. 1, according to various aspects, the link database 136 associated with the live-view server 104 may be configured to store dynamic hyperlinks (e.g., provided to the third-party service provider 102) in association with continuously updated live views received from vehicles ("Vehicle A", "Vehicle B" and "Vehicle C" of vehicles 108a-108n) and/or most recent stored views associated with each specific location, each specific structure and/or each specific point of interest being monitored/tracked by the live-view server 104.

Figure 5:
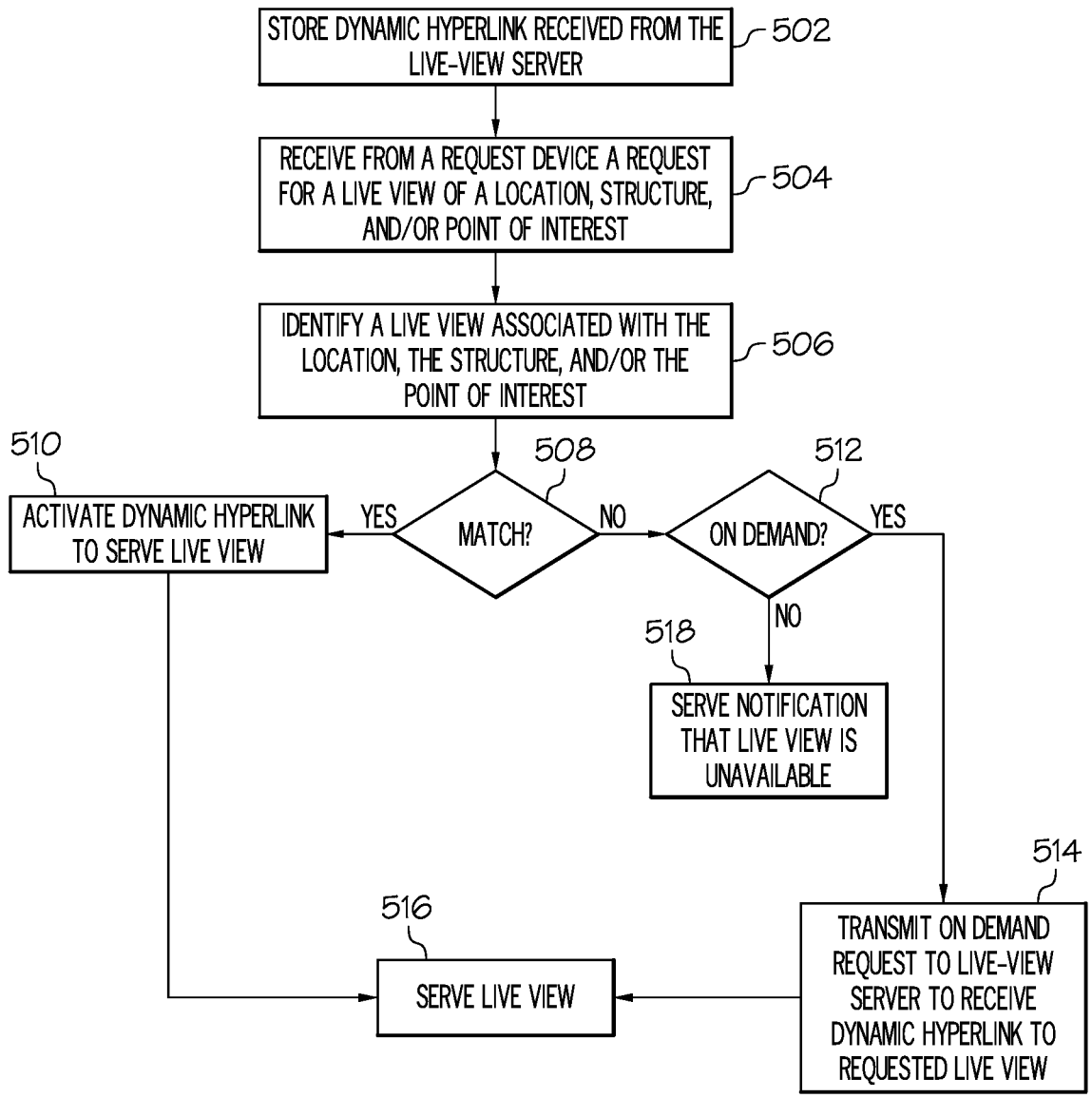
FIG. 5 depicts a flow diagram of an illustrative process for serving a live view by the third-party service provider server according to one or more embodiments shown and described herein.

Next, FIG. 5 illustrates a process for serving a live view by the third-party service provider server 102 according to various aspects. Initially, the third-party service provider server 102 may be programmed and/or configured to store dynamic hyperlinks (See FIG. 1, e.g., dynamic hyperlinks 124, 128 and 132) received from the live-view server 104 in its associated live-view database 122 (at block 502). Notably, each dynamic hyperlink may be associated with a particular location (e.g., "LOC A"), a particular structure (e.g., "STR B"), and/or a particular point of interest (e.g., "POI C") that the third-party service provider server 102 has requested the live-view server 104 to monitor/track. Next, according to various aspects, the third-party service provider server 102 may be programmed and/or configured to receive, from a request device, a request for a live view of a specific location, a specific structure, or a specific point of interest (at block 504). Here, in view of FIG. 1, according to various aspects, a request device may include a vehicle 108a-108n. Here, similar to as described above, the vehicle 108a-108n may communicate with the third-party service provider server 102 via a wireless telematic communication unit 116 (see FIG. 2) communicatively coupled to a wireless carrier system 118 or 142 via a base station 120 or 144 respectively. The base station 120 or 144 is configured to utilize at least one communication network (e.g. communication network 106) communicatively coupled to the wireless carrier system 118 or 142 to relay data (e.g., request for a live view from vehicle 108a-108n) received from the computer 112, via the wireless telematic communication unit 116, to the third-party service provider server 102. Again, according to various aspects, the communication network 106 may include a Wide Area Network (WAN), the Internet, a Wi-Fi network, and/or the like.

According to further aspects, in view of FIG. 1, a request device may include a mobile phone 138 (e.g., unassociated with a vehicle 108a-108n) and/or a computer 140 (e.g., personal computer, and/or the like). With respect to the mobile phone 138, the mobile phone 138 may communicate with the third-party service provider server 102 via the bases station 144, the wireless carrier system 142 and the communication network 106 as described above. With respect to the computer 140, the computer 140 may communicate with the third-party service provider server 102 via the communication network 106.

Referring back to FIG. 5, in response to a request for a live view from any of the request devices described, the third-party service provider server 102 may be programmed and/or configured to identify at least one live view, from the live-view database 122, associated with the specific location, the specific structure, or the specific point of interest requested by the request device (at block 506). According to various aspects, in view of FIG. 1, the third-party service provider server 102 may be programmed and/or configured to match a requested location, structure, and/or point of interest (e.g., via GPS coordinates, name of location, name of structure and/or name of point of interest, and/or the like) with those it has requested the live-view server 104 to monitor/track (at block 508). Here, according to various aspects, if a match exists, the third-party service provider server 102 may be programmed and/or configured to activate the dynamic hyperlink (at block 510, e.g. FIG. 1, dynamic hyperlink 124, 128, or 132). In response to activation of the dynamic hyperlink, the third-party service provider server 102 may be programmed and/or configured to serve to the request device, via the dynamic hyperlink, the at least one live view associated with the specific location, the specific structure, or the specific point of interest requested (at block 516). More specifically, upon activation, the third-party service provider server 102 establishes a communication link, via the communication network 106, with the live-view server 104 to stream a live view currently associated, by the live view server 104, with the dynamic hyperlink (e.g., dynamic hyperlink 124, 128, or 132) in its link database 136. Once the communication link is established, the third-party service provider server may be programmed and/or configured to relay the live view being streamed from the live-view server 104 to the request device (see FIG. 1, e.g., a vehicle 108a-108n, a mobile phone 138, a computer 140). According to various aspects, as described herein, the third-party service provider server 102 may relay the live view being streamed from the live-view server to the request device (e.g., vehicle 108a-108n) via the communication network 106, the wireless carrier system 118 or 142, the base station 120 or 144 and the wireless telematic communication unit 116 associated with a vehicle. According to other aspects, as described herein, the third-party service provider server 102 may relay the live view being streamed from the live-view server to the request device (e.g., mobile phone 138) via the communication network 106, the wireless carrier system 142, and the base station 144. According to yet further aspects, as described herein, the third-party service provider server 102 may relay the live view being streamed from the live-view server to the request device (e.g., computer 140) via the communication network 106. As described herein, the live view being streamed may, according to some embodiments, include a most current view (e.g., video) associated with the requested particular location, particular structure, and/or particular point of interest (e.g., when a live view is currently unavailable, no participating vehicles 108a-108n in proximity to the requested particular location, particular structure, and/or particular point of interest). Such streamed live views may be viewed on a live-view interface 210 as described herein (See FIG. 3). According to some aspects such an interface may be similarly displayed on a mobile phone screen 146 and/or computer screen 148 (See FIG. 1).

Referring again to FIG. 5, as described above, the third-party service provider server 102 may be programmed and/or configured to match a requested location, structure, and/or point of interest (e.g., via GPS coordinates, name of location, name of structure and/or name of point of interest, and/or the like) with those it has requested the live-view server 104 to monitor/track (at block 508). Here, according to various aspects, if a match does not exist, the third-party service provider server 102 may be programmed and/or configured to determine whether "on demand" services are available (at block 512). Here, according to various aspects, a requestor associated with a request device may need to subscribe to "on demand" live views. According to other aspects, the third-party service provider server 102 may automatically process requests "on demand" as locations, structures, and/or points of interest to be monitored/tracked in the future (e.g., a way to build a monitoring/tracking list with locations, structures, and/or points of interest important to service provider requestors). Here, in such aspects, if the "on demand" services are available, the third-party service provider server 102 may be programmed and/or configured to request a live view for the 'on demand' location, structure, and/or point of interest in real time (at block 514). If available, the third-party service provider server 102 will serve the streaming live view and/or a most recent view (e.g., video) to the request device as described above (at block 516). Alternatively, if the "on demand" services are not available, the third-party service provider server 102 may be further programmed and/or configured to serve a notice (e.g., via the live view interface 210, mobile phone screen 146, computer screen 148, and/or the like) that the requested live view is not available (at block 518).

In view of FIG. 3, according to various aspects described herein, a third-party service provider (e.g., a map provider, a navigation system provider, and/or the like) may now supplement its map, its flagged locations (e.g., 310, 312), its structures (e.g., 322) and/or its points of interest (e.g. 314, 324, 326) with various icons (e.g., 302, 304, 306, 308, 316, 318, 320, and/or the like). Each icon is easily selectable to request a live view at that particular location, that particular structure, and/or that particular point of interest. In addition, according to some embodiments, the live-view interface 210 may further include a search box 328 to manually request a live view associated with a particular location, a particular structure, and/or a particular point of interest. According to alternative aspects (not shown), a live-view interface 210 may simply include a search box (e.g. 328, e.g. without a map, locations, structures, and/or points of interest displayed proximate to a service recipients current or entered location) to manually request a live view associated with a particular location, a particular structure, and/or a particular point of interest. Similarly, according to alternative aspects, such icons and/or the search box may be incorporated into other interfaces (e.g., Google STREET VIEW®). In such aspects, a requestor is no longer limited to static, stale and/or outdated images (e.g., like STREET VIEW®). Aspects of the present disclosure enable, upon selection/search, the display of live views associated with that particular location, particular structure, and/or particular point of interest.

According to various aspects described herein, reference is made to participating vehicles. According to some aspects, all vehicles 108a-108n including one or more cameras 110a-110e are participating vehicles. According to alternative aspects, each vehicle 108a-108n may need to register and/or opt-in to communications of live views (e.g., transmissions of live views to the live-view server, transmissions of streaming live views from the third-party server, and/or the like).

According to various aspects described herein, the live-view server 104 may be further programmed and/or configured to receive multiple live views (e.g., from multiple vehicles 108a-108n) covering an identical location, an identical structure, and/or an identical point of interest. According to such aspects, the live-view server 104 may be further programmed and/or configured to evaluate and select a best quality live view for transmission to request devices (e.g., for association with a dynamic link in the link database 136). According to various aspects, a best quality live view may be determined based on data transmission speed (e.g., highest) associated with a vehicle 108a-108n, a data packet error rate (e.g., lowest) associated with a vehicle 108a-108n, and/or an image assessment (e.g. highest quality metric) performed by a video editor (not shown) associated with the live-view server 104, and/or the like. Further, according to various aspects, the live-view server 104 may be further programmed and/or configured to edit and/or process live views (e.g., video editor) if a quality of a live view is lacking.

According to alternative aspects of the present disclosure, a request device may request a live view for a particular location, a particular structure, and/or a particular point of interest directly from the live-view server 104. According to such aspects, the live-view server 104 may be further programmed and/or configured to serve requested live views (e.g., obtained from vehicles 108a-108n as described herein) directly to the request device (e.g., a vehicle 108a, a mobile phone 138, a computer 140) in a manner similar to that as previously described herein.

According to yet another aspect of the present disclosure, referring to FIG. 1, each camera of the one or more cameras 110a-110e of each vehicle 108a-108n may be configured to continuously buffer a live view of a location, a structure, and/or a point of interest as it travels. According to various aspects, such buffered footage may be timestamped. In such an aspect, the live-view server 104 may obtain this buffered footage of the location, the structure, and/or the point of interest as a most current/recent view (e.g., video) of that location, that structure, and/or that point of interest. This may be especially useful when a requested live view is currently unavailable (e.g., no participating vehicle 108a-108n in proximity to the requested particular location, particular structure, and/or particular point of interest).

According to yet other aspects of the present disclosure, a request from a request device may include a request for a particular camera of the one or more cameras 110a-110e of each vehicle 108a-108n. In such an aspect, additional information including an indication of the camera location, type of camera, and/or the like may be captured by the computer 112 of each vehicle 108a-108n and transmitted to the live-view server 104 for storage in association with each live view.

It should now be understood that the systems and methods described herein are suitable for serving live camera views of specific locations, specific structures, and/or specific points of interest to requesting devices. Such systems and methods enable a third-party service provider (e.g., commercial map service provider, navigation system service provider, and/or the like) to supplement or supplant its existing services (e.g., map service, navigation service, and/or the like) with one or more than one real-time live view of a particular location, a particular structure, and/or a particular point of interest, thereby avoiding static, stale and/or outdated images that often frustrate and/or disappoint service recipients.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for serving live views captured by a plurality of vehicles having live-view cameras to request devices, the system comprising:

a third-party server comprising a live-view database; and a live-view server communicatively coupled with the third-party server, wherein the live-view server comprises a live-view application, the live-view application executable by the live-view server to:

receive, from the third-party server, a request for a live view of each location of a plurality of locations, each structure of a plurality of structures, or each point of interest of a plurality of points of interest to be tracked or monitored by the live-view server on behalf of the third-party server;

identify at least one vehicle of a plurality of vehicles positioned at each location, each structure, or each point of interest, wherein a live-view camera of the at least one identified vehicle captures each requested live view;

obtain each requested live view from the live-view camera of the at least one identified vehicle; and transmit, to the third-party server, a dynamic hyperlink associated with each requested live view for storage in the live-view database;

wherein the third-party server:

receives, from a request device, a request for a live view of a specific location, a specific structure, or a specific point of interest;

identifies at least one live view, from the live-view database, associated with the specific location, the specific structure, or the specific point of interest requested by the request device; and serves to the request device, via the dynamic hyperlink, the at least one live view associated with the specific location, the specific structure, or the specific point of interest.

2. The system of claim 1, wherein the third-party server comprises a plurality of third-party servers, wherein the live-view server comprises a link database, and wherein the live-view application is further executable by the live-view server to:
  segregate, in the link database, requested live views for each of the plurality of third-party servers.

3. The system of claim 1, wherein the request device is not associated with a vehicle of the plurality of vehicles.

4. The system of claim 1, wherein the request device comprises a vehicle of the plurality of vehicles.

5. The system of claim 1, wherein the live-view application is further executable by the live-view server to:
  identify more than one vehicle positioned at each location, each structure, or each point of interest, wherein a live-view camera of the more than one identified vehicle captures each requested live view;
  obtain each requested live view from each live-view camera of the more than one identified vehicle;
  determine a requested live view, captured by one of the more than one identified vehicle, to transmit, via the dynamic hyperlink to the third-party server; and
  transmit the dynamic hyperlink, associated with the requested live view captured by the one of the more than one identified vehicle, to the third-party server for storage in the live-view database.

6. The system of claim 5, wherein the live-view application is further executable by the live-view server to:
  determine the requested live view to transmit, via the dynamic hyperlink, to the third-party server based on a network connection speed between the live-view server and the more than one identified vehicle.

7. The system of claim 5, wherein the live-view application is further executable by the live-view server to:
  determine the requested live view to transmit, via the dynamic hyperlink, to the third-party server based on a quality metric associated with each requested live view obtained from each live-view camera of the more than one identified vehicle.

8. The system of claim 1, wherein the live-view application is further executable by the live-view server to:
  obtain a live view from any live-view camera of any of the plurality of identified vehicles on demand.

9. The system of claim 1, wherein the specific location, the specific structure, or the specific point of interest is associated with global positioning system (GPS) coordinates;
  wherein the live-view application is further executable by the live-view server to:
    identify the at least one vehicle of the plurality of vehicles positioned at each location, each structure, or each point of interest based on location information provided by a GPS receiver associated with each of the plurality of vehicles; and
    associate the dynamic hyperlink with the location information; and
  wherein the third-party server further:
    identifies the at least one live view associated with the specific location, the specific structure, or the specific point of interest requested by the request device based on the location information associated with the dynamic hyperlink and the GPS coordinates associated with the live view request.

10. The system of claim 1, wherein the live-view application is further executable by the live-view server to:
  update a live view associated with each dynamic hyperlink.

11. A computer-implemented method for serving live views captured by a plurality of vehicles having live-view cameras to request devices, the method comprising:
  receiving from a third-party server, by a live-view server communicatively coupled to the third-party server, a request for a live view of each location of a plurality of locations, each structure of a plurality of structures, or each point of interest of a plurality of points of interest to be tracked or monitored by the live-view server on behalf of the third-party server;
  identifying, by the live-view server, at least one vehicle of a plurality of vehicles positioned at each location, each structure, or each point of interest, wherein a live-view camera of the at least one identified vehicle captures each requested live view;
  obtaining, by the live-view server, each requested live view from the live-view camera of the at least one identified vehicle;
  transmitting to the third-party server, by the live-view server, a dynamic hyperlink associated with each requested live view for storage in a live-view database of the third-party server;
  receiving from a request device, by the third-party server, a request for a live view of a specific location, a specific structure, or a specific point of interest;
  identifying from the live-view database, by the third-party server, at least one live view associated with the specific location, the specific structure, or the specific point of interest requested by the request device; and
  serving to the request device, by the third-party server, the at least one live view associated with the specific location, the specific structure, or the specific point of interest via the dynamic hyperlink.

12. The computer-implemented method of claim 11, further comprising:
  identifying, by the live-view server, more than one vehicle positioned at each location, each structure, or each point of interest, wherein a live-view camera of the more than one identified vehicle captures each requested live view;
  obtaining, by the live-view server, each requested live view from each live-view camera of the more than one identified vehicle;
  determining, by the live-view server, a requested live view, captured by one of the more than one identified vehicle, to transmit, via the dynamic hyperlink to the third-party server; and
  transmitting, by the live-view server, the dynamic hyperlink, associated with the requested live view captured by the one of the more than one identified vehicle, to the third-party server for storage in the live-view database.

13. The computer-implemented method of claim 12, further comprising:
  determining, by the live-view server, the requested live view to transmit, via the dynamic hyperlink, to the third-party server based on a network connection speed between the live-view server and the more than one identified vehicle.

14. The computer-implemented method of claim 12, further comprising:
  determining, by the live-view server, the requested live view to transmit, via the dynamic hyperlink, to the third-party server based on a quality metric associated with each requested live view obtained from each live-view camera of the more than one identified vehicle.

15. The computer-implemented method of claim 11, further comprising:
obtaining, by the live-view server, a live view from any live-view camera of any of the plurality of identified vehicles on demand.

16. The computer-implemented method of claim 11, further comprising:
updating, by the live-view server, a live view associated with each dynamic hyperlink.

17. A system for serving live views captured by a plurality of vehicles having live-view cameras to request devices, the system comprising:
a first processing device communicatively coupled to a live-view database; and
a second processing device communicatively coupled with the first processing device, wherein the second processing device comprises a non-transitory processor-readable storage medium comprising programming instructions that, when executed, cause the second processing device to:
receive, from the first processing device, a request for a live view of each location of a plurality of locations, each structure of a plurality of structures, or each point of interest of a plurality of points of interest to be tracked or monitored by the second processing device on behalf of the first processing device;
identify at least one vehicle of a plurality of vehicles positioned at each location, each structure, or each point of interest, wherein a live-view camera of the at least one identified vehicle captures each requested live view;
obtain each requested live view from the live-view camera of the at least one identified vehicle; and
transmit to the first processing device, a dynamic hyperlink associated with each requested live view for storage in the live-view database;
wherein the first processing device comprises a non-transitory processor-readable storage medium comprising programming instructions that, when executed, cause the first processing device to:
receive, from a request device, a request for a live view of a specific location, a specific structure, or a specific point of interest;
identify at least one live view, from the live-view database, associated with the specific location, the specific structure, or the specific point of interest requested by the request device; and
serve to the request device, via the dynamic hyperlink, the at least one live view associated with the specific location, the specific structure, or the specific point of interest.

18. The system of claim 17, wherein the first processing device comprises a plurality of third-party processing devices, wherein the second processing device comprises a link database, and wherein the programming instructions, when executed, further cause the second processing device to:
segregate, in the link database, requested live views for each of the plurality of third-party processing devices.

19. The system of claim 17, wherein the request device is not associated with a vehicle of the plurality of vehicles.

20. The system of claim 17, wherein the request device comprises a vehicle of the plurality of vehicles.

* * * * *